United States Patent [19]

Burke

[11] Patent Number: 5,729,929

[45] Date of Patent: Mar. 24, 1998

[54] AGRICULTURAL MULCH FILMS AND METHODS FOR THEIR USE

[75] Inventor: Thomas C. Burke, Williamsburg, Va.

[73] Assignee: Blessings Corporation, Newport News, Va.

[21] Appl. No.: 671,322

[22] Filed: Aug. 25, 1996

[51] Int. Cl.[6] .............................. A01N 25/34; A01G 7/00
[52] U.S. Cl. ........................................................ 47/9
[58] Field of Search ................................... 47/9, 25

[56] References Cited

U.S. PATENT DOCUMENTS

| | | | |
|---|---|---|---|
| 3,839,139 | 10/1974 | Ito et al. | 47/9 X |
| 4,782,626 | 11/1988 | Shanley et al. | 47/9 |
| 4,896,453 | 1/1990 | Jacob | 47/9 |
| 5,117,580 | 6/1992 | Brown | 47/9 |
| 5,138,792 | 8/1992 | Allingham | 47/9 |
| 5,163,247 | 11/1992 | Weber et al. | 47/9 |

FOREIGN PATENT DOCUMENTS

| | | | |
|---|---|---|---|
| 97242 | 8/1979 | Japan | 47/9 |
| 81038 | 4/1988 | Japan | 47/9 |

*Primary Examiner*—John A. Ricci
*Attorney, Agent, or Firm*—Cushman Darby & Cushman IP Group Of Pillsbury Madison & Sutro LLP

[57] ABSTRACT

The present invention provides improved agricultural mulch films and methods for their use.

16 Claims, 2 Drawing Sheets

AGRICULTURAL MULCH FILMS AND METHODS FOR THEIR USE

FIELD OF THE INVENTION

The present invention provides agricultural mulch films and methods for their use which allow improved circulation of moisture, utilization of fertilizer and reduced weed growth.

BACKGROUND OF THE INVENTION

The plastics used for mulch films are generally low density polyethylene poly(vinyl chloride), polybutylene, or copolymers of ethylene with vinyl acetate. Mulch films control radiation, soil temperature and humidity, weed growth, pest infestation, soil compaction, and the degree of carbon dioxide retention.

Clear polyethylene is more effective in trapping heat than black or smoke-gray films; soil temperatures may rise 11° C. (52° F.) under clear film, as compared to 3.4°–5.4° C. (38.1°–41.7° F.) under black film. Radiative heat loss at night, as the soil cools, is lessened by polymer films. In some cases, weed control has been reported because of solar heating of polyethylene mulches.

Crops grown with mulch films have been reported to mature faster, with increased yields, and in most cases, a cleaner product is obtained. For example, a 1.6-hectare melon farm reported a two to threefold increase in yield and ripening two weeks earlier as a result of using black polyethylene mulch. (Encyclopedia of Polymer Science and Engineering, 2nd Edition (Mark et al Eds.) John Wiley & Sons (1985) vol. 1, p. 612).

Improved results have also been reported with single color films which are selectively opaque to the photosynthetically active radiation required for plant development which encourages weed growth. These films have been designed to transmit solar radiation in the far-red and a portion of the green spectrum to heat the soil covered by the mulch. See, Arlingham (U.S. Pat. No. 5,138,792) and Daponte et al (WO 94/05727).

Elimination of weeds and avoidance of soil compaction by the use of black plastic mulch eliminates the need for cultivation; therefore, root damage and stunting or killing of plants are avoided. Fertilizer and water requirements are also reduced.

Accordingly, mulch films modify the soil and air microclimate in which a plant is growing.

The most commonly used mulch materials are synthetic, namely, plastic film 1 or 1½ mils thick and 3 to 6 feet wide. Plastic film, especially polyolefin film, is inexpensive and easily applied to the planting rows with machines. Black, opaque plastic film is most often used to control weed growth without resorting to the additional cost and labor of chemical herbicides application.

The changes brought about in the growing plant environment by mulching have the greatest influence on crop development during periods when growing conditions are less than ideal. Weather conditions that commonly result in plant stresses are low rainfall, cool air temperature and cool soil temperature. Mulching may help alleviate these stresses. Moreover, mulch also creates a physical barrier that controls weeds (or weed growth), evaporation, leaching, soil compaction and root pruning.

Mulches reduce the evaporation of water from the soil by 10 to 50 percent or more. Mulches also save water for use by the crop plant by reducing competition from weeds, which is very important in dry seasons.

Certain mulches reduce weed growth and the competition of weeds for light, water and nutrients. Opaque plastic mulches prevent light penetration necessary for weeds to grow. If transparent to clear synthetic plastic mulches are used, a selective herbicide or soil fumigation is necessary to control weeds germinating under the mulch.

Mulching helps maintain good soil structure by preventing soil crusting and compaction. Mulched soil remains loose and friable, thereby providing good aeration for plant roots. An extensive root system develops in mulched soil, especially in the upper 2 inches where drying of unmulched soil, crusting and cultivation often limit root growth. The mulch provides a physical barrier that prevents root pruning and injury by cultivation and hoeing. These factors contribute to a healthy root system and more efficient use of nutrients.

With mulching, the biological activity of soil microorganisms is increased due to the loose, well-aerated soil condition and uniform moisture, and higher uniform temperatures. This results in a more rapid breakdown of organic matter in the soil and the release of plant nutrients for crop growth.

The use of black, opaque plastic film mulches gives all of the benefits described above with the additional benefit of weed control. Crops grown under black mulch are virtually weed free and no fumigants or herbicides are required as is the case with clear or translucent mulches. With the latter, the soil must be treated with the chemical agent prior to or at the time of placing the film on the ground. The seeding of such ground must be postponed until any potential harmful effects of the chemical agents have subsided so that there are no detrimental effects on crop seeds or young transplants. Black film mulch virtually eliminates the growth of all weeds by screening out the ultraviolet and visible radiation from incident sunlight so necessary for any plant growth.

To those skilled in the art, carbon black is by far the best light screen and especially carbon channel black, which offers the highest degree of ultraviolet protection of any pigment commonly used in the formulation of plastics and paints, and for articles intended for long term outdoor exposure.

Kitamura et al (U.S. Pat. No. 4,920,692) describes a mulching film for repelling insect pests which contains a reflective top layer with a laminated underside of black film containing carbon black. The patentees require the upper reflective layer to have a reflective peak at a wavelength of less than 0.4 μm and a reflexive spectrum having not less than 1.4 of a ratio of the ultraviolet peak reflectance to the visible light reflectance and a preferred visible light reflectance at a wavelength of 0.5 μm. The laminate of Kitamura et al is continuous across its width of the film and is taught to have the added advantages of being capable of lowering the underground temperature and preventing the propagation of weeds.

Unlike the laminate taught by Kitamura which only seeks to lower the temperature under the film across the width of the planting bed, the present invention provides a mulching film which produces variable temperature and evaporation zones which, in turn, produces an advantageous microclimate circulation beneath the film.

SUMMARY OF THE INVENTION

It is an object of the present invention to provide a mulch film which produces an advantageous microclimate circulation advantageous for crops and yet detrimental to weeds.

Another object of the present invention is to provide a laminate film or, more preferably, a multilayered co-extruded film, comprising at least one heat absorptive or black film layer with a substantially central white, silver or reflective layer on at least one side of the film.

A further object of the present invention is to provide a co-extruded, multi-layered film which is capable of lowering the surface and/or subsurface temperature and causing the migration of harmful mineral salts in the soil to the edges of the film, when in use.

In one embodiment, the present invention provides a polymeric mulch film or sheet which includes energy absorbing or transmitting regions and at least one central energy reflective region between the energy absorbing or transmitting regions which are constructed and arranged such that when the film or sheet is placed on or over a planting bed, a temperature differential is produced between the regions of the bed covered by the energy absorbing or transmitting regions of the film or sheet and the energy reflective regions of the film or sheet.

The film or sheet of the present invention may be made by coextrusion or lamination of the separate regions. Preferably, the film or sheet is made by coextrusion.

The energy absorbed or transmitted and reflected by the film or sheet is light energy, generally any one of the visible, ultraviolet and far red portions of the spectrum such that in use a temperature differential is produced in the plant bed as a result of the differential absorption and reflection of light; the cooler portion being toward the center of the bed and the heated portion being toward the outer portion or edge of the bed.

In one embodiment, the mulch film or sheet of the present invention provides average day-time temperature differential of about 2° to 30° F. between the central area of the planting bed and the peripheral of the planting bed.

In a further embodiment, the mulch film or sheet of the present invention provides a planting bed which has a ratio of maximum soluble salt concentration in an area greater than halfway across the bed from the substantial centerline of the bed to soluble salt concentration at the substantial centerline of the bed, of greater than about 1.3, preferably in the range of about 1.3 to 1.8, alternatively in the range of about 1.3 to 1.5.

The energy absorbing or transmitting regions of the film or sheet are preferably black or clear (translucent or transparent) but may be any of a number of colors known in the art, so long as heat energy is absorbed or transmitted to create the temperature differential described herein. The energy reflective regions of the film or sheet are preferably white or silver.

In one embodiment, the mulch film or sheet of the present invention is a coextruded film or sheet of energy absorbing material, such as a black polymeric material, with an energy reflective material, such as a silver or white polymeric material, substantially centered on the absorbing material and running the substantial length of the film or sheet.

The mulch film or sheet may be made in any commercially convenient size, such as in widths of 54", 60", 66" and 72".

The reflective regions of the film or sheet of the present invention may cover an area of about 25 to 75% of the area of the film or sheet, alternatively, an area of about 35 to 65% of the area of the film or sheet.

In a further embodiment, the present invention provides a method of increasing at least one of the salt concentration and the temperature at the periphery of a planting bed relative to the center of the bed along approximately the same horizontal plane, by use of the presently disclosed mulch film or sheet. By increasing the temperature and/or salt concentration at the periphery of the bed relative to the center of the bed, a temperature and/or salt concentration is produced which benefits crops while being detrimental to weeds.

These and other objects and advantages of the present invention will be apparent to those skilled in the art from the following description.

DETAILED DESCRIPTION OF THE INVENTION

Figure 1:
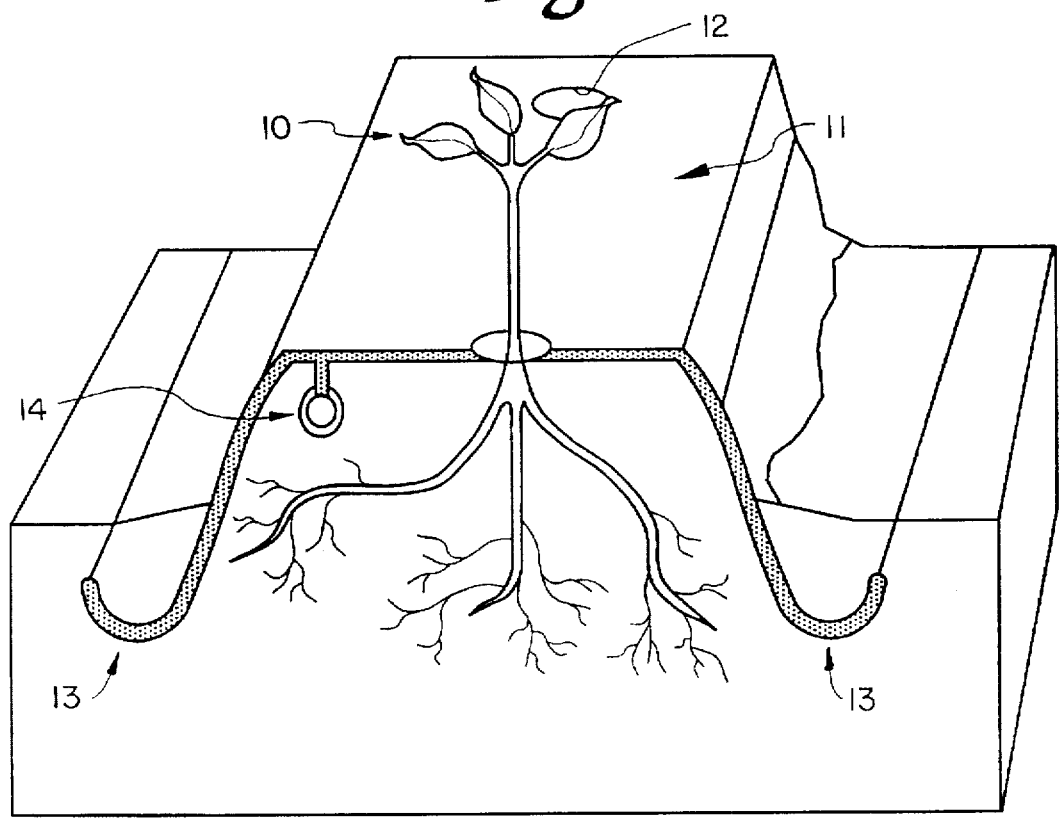
FIG. 1 shows a schematic of the typical mulch film in use.
Figure 2:
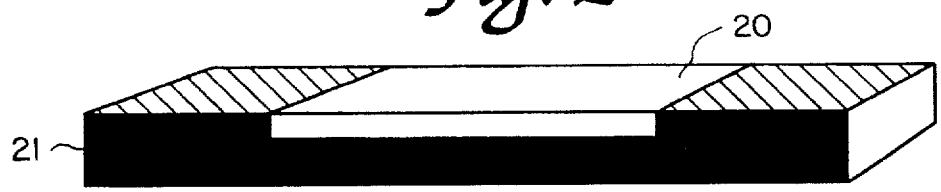
FIG. 2 schematically depicts an embodiment of the present invention wherein a coextruded reflective center strip layer (white) is surrounded on three sides by an energy absorbing layer (black).
Figure 3:
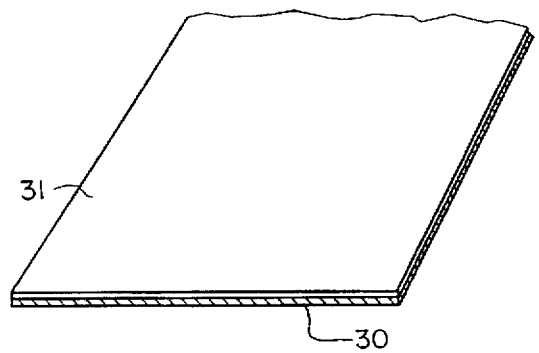
FIG. 3 shows the mulching film according to Kitamura et al, as described in U.S. Pat. No. 4,920,692.

The present invention provides a mulch film or sheet and methods which produce a variable temperature zone in a plant bed covered by the film or sheet in the region of the root zone of the plant bed. This temperature differential can be achieved by carbon black or black iron oxide or other darkly colored pigment added to the side of the mulch film or sheet farthest from the bed center to produce a hot zone due to the radiation absorbing properties of the dark portion of the mulch film and addition of titanium dioxide, zinc oxide, aluminum flake, etc. in a center stripe of the mulch film to provide a radiation reflecting center layer to create a temperature differential which may be 20°–30° F. between the sides and center of the planting bed.

When the width of the stripe is properly selected, preferably 18 inches but as narrow as 6 inches and as great as 45 inches, differential microclimate is generated which conveys soluble salts which are detrimental to the plant away from the plant, at the center of the bed, and toward the edges of the plant bed. A hot, dry zone is created at the edges of the plant bed that over the growing season becomes highly concentrated with soluble salts. This inhospitable zone is an effective deterrent to invasive weeds which typically send runners from areas adjacent to the plant bed in search of fertilizer and water. Thusly, the effect is a weed inhibiting action on either side of the plant, near the edges of the plant bed.

The overall yield of the plant is increased and, in some cases, such as tomatoes, an early harvest has been observed. The total number of top quality fruits or vegetables has been observed to increase as well as the total number of early top quality fruits.

In addition, the properties of the mulch film or sheet can be varied to better match the requirements of the different areas of the plant bed by varying the composition of the two or more layers. The tuck areas of the film, which are covered with soil to anchor the film, and the sides of the plant bed require more physical strength and durability from a handling by the farmer and from tractor tire traffic and thusly a higher tensile strength, puncture resistant polymer composition such as high molecular weight polyethylene or a metallocene based impact resistant polyethylene can be used. Moreover, the top of the plant bed receives more direct sunlight, pesticide and rain exposure and, therefore, requires a higher level of stabilization. In this area, one possible improvement to the formulation would be the incorporation of a higher level of hindered amine light stabilizers (HALS) and a higher molecular weight, low migratory antioxidant such as Tetrakis (methylene (3,5-di-tert-butyl-4-hydroxyhydro-cinnamate))-methane; CIBA-GEIGY) to the reflective layer. Such modifications allow the film to be more tailored to the environment and requirements of the different portions of the mulch film within the scope of the presently disclosed invention.

Plastic agricultural mulch film or sheets are generally made of a cast embossed or smooth blown pigmented polyolefins, co- or terpolymers, and vinylester copolymers, such as polyethylene (i.e., LDPE), polyethylene/ethylene vinyl acetate, polypropylene or fluoropolymers, co- or terpolymers such as polytetrafluoro-ethylene (PTFE) and polyvinylidene chloride (PVDC), polyvinylchloride (PVC), polycarbonate (PC), polymethylmethacrylate (PMMA) or mixtures of the above, as known in the art. Polymeric thin film for mulching applications are generally made in the thickness range of 0.5 mil to 4 mils (1 mil=0.001 inches).

The film is laid with machinery or by hand across a raised plant bed and is anchored along either side of the bed with soil. Methyl bromide or other gas pesticide are often injected beneath the film into the plant bed before application.

Among other things, the film controls the growth of plants underneath the film, modifies the temperature of the soil, helps control water evaporation and fertilizer loss due to erosion and provides a clean surface upon which produce grows.

The advent of mulch film was a major advance in the area of commercial produce cultivation. In general, darker films such as black mulch pigmented with carbon black are used in colder climates and seasons and lighter films with reflective surfaces such as films pigmented white with titanium dioxide are used in hotter climates and seasons. The black mulch film provides good opacity and hence excellent weed control. Films pigmented with just white pigments do not give the same opacity and are not as good in controlling weed growth.

The method of film production is generally a smooth blown process, a post-embossed blown process or a cast embossed process. While much of the mulch film produced is a monolayer product, recent advances have included coextruded film. A coextruded film utilizes two separate extruders feeding into a single circular or slot die. The film exiting the die can be made to have two distinctive layers.

Black and white coextruded mulch film became a major improvement by combining the opacity of the black mulch with the reflectivity and coolness of the white layer. With the white side facing up, this film provides good weed control in hotter climates and provides a cooler bed for the plant.

The present invention provides an improved mulch film containing, preferably, coextruded layers, wherein at least one or more strips or stripes of reflectively pigmented polymer is surrounded by or laid in a wider layer of energy absorbing pigmented polymer. The present invention provides, therefore, an inlaid or laminated reflective layer surrounded by an energy absorbing material. The reflective strip in the film should preferably occupy a width across the film of about 25% to 75%, alternatively 35% to 65%, of the entire film and should preferably be centered so that the reflective surface provides a cooler region across the top of the bed. The film along the sides of the bed and on the underside, i.e., next to the soil, should be energy absorbing, preferably black or clear.

The present inventor has discovered that, with typical mulch film, as water evaporates from the top of the bed, it leaves salt deposits concentrated at the top of the soil bed, under the mulch film. These salt deposits build up over time and can cause the plant growth to be stunted or even result in the demise of the plant.

By having a cooler, reflective band near the plant and a darker, hotter band near the edge of the bed, the present invention provides for water evaporation directed away from the plant causing the salts to build up away from the plant. The net effect of the warmer edge and cool center of the soil under the film of the present invention is to provide a barrier to weeds outside the plant bed from sending runners or roots up underneath the film and establishing themselves on the plant bed.

Nut grass, which can punch through most typical mulch films, is a particular pest since by extending its runners it competes with the plant for fertilizer and water. Accordingly, by creating a temperature differential between the soil next to the plant and at the edge of the planting bed, the present invention provides salt deposition on the outer edges of the bed upon water evaporation, thus forming a barrier to weed propagation.

Moreover, the present invention provides a great flexibility in being able to produce and maintain a desired temperature of the bed by varying the ratio of the width of the reflective material to the width of the overall film, depending on the plants and growing season of a particular application.

The starting resins of the present invention can include conventional thermoplastic resins.

In addition to those mentioned above, suitable examples of resins are ethylene homopolymer or copolymers such as low-density polyethylene, high-density polyethylene, ethylene butene-1 copolymers, ethylene-4-methylpentene-1 copolymers, ethylene-vinyl acetate copolymers, ethylene-acrylic acid copolymers, ethylene methyl methacrylate copolymers, ethylene-vinyl acetate-methyl methacrylate copolymers, ethylene-ethyl acrylate copolymers, polypropylene, and vinyl chloride resins. These resins may be used alone or in a combination of two or more of those described.

The films of the present invention are preferably polyethylene films, high molecular weight polypropylene or low density polyethylene (LDPE). Non-limiting Examples of useful resins include 0.925 g/cc, 6.0 MI LDPE, terpolypolypropylene, high molecular weight-high density polyethylene/linear low density polyethylene, and ethylene vinyl acetate/linear low density polyethylene.

The reflectively pigmented layer of the present invention preferably contains titanate compounds such as potassium titanate, calcium titanate, magnesium titanate, barium titanate, strontium titanate, or lithium titanate; and/or zirconium compounds, such as zirconium silicate or zirconium oxide. The reflectively pigmented layer of the present invention preferably contains titanium dioxide, aluminum flake and/or zinc oxide. Along with the above pigments, the reflectively pigmented layer of the present invention, preferably, further contains a UV stabilizer. Commonly used UV stabilizers useful in the present invention include nickel dithiocarbamate and hindered amine light stabilizers (i.e., tin 622, or 3346, benzophenone, etc.).

The amount of pigment contained in the reflectively pigmented stripe layer is variable depending on thickness of the film and width of the film; however, a preferred range of 0.5 to 80% by weight of the inlaid layer, more preferably 0.5 to 30% by weight, most preferably 0.5 to 20% by weight.

The energy absorbing pigmented layer preferably contains carbon black. Although the energy absorbing layer is preferably black, one skilled in the art will appreciate that other colors may be used to produce the presently disclosed effect of creating a microclimate under the mulch film which is cooled with a lower salt concentration toward the center of the mulch bed than on the edges.

The amounts of carbon black contained in the energy absorbing pigmented polymer may be varied; however, a preferred range of amounts is 2 to 80% by weight of energy absorbing polymer layer, more preferably from 30 to 80% weight.

The present invention can be made as a laminate or coextruded film. The preferred embodiment is made as a coextruded film. The film of the present invention can be prepared, for example, by the following steps.

The two layer film can be prepared by separately treating a reflectively pigmented compound-containing resin composition and a carbon black-containing resin composition with a conventional processing machine as usually used in blown film processing, T-die film processing, calendar processing, and the like, or by a two color tubular film processing method, by extruding separately each resin composition from two extruders provided with a specific two color blown film die wherein the half periphery of the film tube is composed of the reflectively pigmented compound-containing resin composition and other half thereof is composed of the carbon black-containing resin composition.

The coextruded film of the present invention can be prepared, for example, by the use of an extrusion apparatus exemplified in any of U.S. Pat. Nos. 5,256,052; 4,789,513; 4,780,258; or 4,600,550.

Briefly, co-extrusion equipment and manufacturing methods useful in preparing the presently disclosed film includes the following. An encapsulating flowplate/feedblock with single manifold T-die or coat hanger type cast film die may be used to extrude onto an embossing drum/rubber roll. The flowplate/feedblock combination in such a method restricts the flow of the reflective layer to a narrow ribbon prior to the two layer entering the die. The embossing drum/rubber roll drum pinch the extruded polymer web as they rotate together, simultaneously drawing down the polymer web into a thin film and quenching the molten material.

Alternatively, a multi-manifold die with separate equal width manifolds and internal deckles, can be used to convey the molten reflective layer and the molten energy absorbing layer through to the die exit, where, prior to their exit from the die, they are joined together. Since the layers are still in a molten state when they are combined, the heat bonds the two separate layers together. The internal deckles on the reflective layer manifold control the width of the reflective strip.

In a further method, a multi-manifold die with fixed width manifolds of unequal length, may be used to convey the molten reflective layer and the molten energy absorbing layer through to the die exit, where prior to their exit from the die, they are joined together. The fixed width of the narrower manifold dictates the width of the reflective strip as a fixed geometry.

The film of the present invention can be made to a thickness suitable for given applications. The mulch film of the present invention can be made to meet tolerances of presently available films. The films of the present invention can be made with a thickness of, for example, about 0.5–4 mil, preferably about 0.5 to 2 mil.

The overall width of the films of the present invention can be in a range of sizes, as found in commercially available black or opaque films. Standard sizes of mulch films include 54", 60-, 66" and 72" widths.

The present invention will be further described by the following non-limiting examples. All amounts expressed as percentages are percent by weight unless indicated otherwise.

Example 1

A 50% 0.920 g/cc, 2 MI LDPE/34% 0.918 g/cc, 4 MI LLDPE resin blend was combined with 15% titanium dioxide and 1% Chimassorb 944 hindered amine light stabilizer in a single layer blown film extruder. The film was pulled down to a gauge of 0.5 mils and slit to a variety of lengths varying from 6" to 28" wide. A second film was made using a 0.926 g/cc, 0.7 MI LDPE resin and 5.5% carbon black in a single cast embossed extruder. The film was pulled down to a 1.0 mil thickness and a 66" width. The films were adhesively laminated together to give single laminated structures with reflective stripe widths of 6", 18", 24" and 28".

Example 2

A 50% 0.925 g/cc, 0.9 MI LLDPE/10% 0.941 g/cc, 6 MI HDPE/34% 0.926 g/cc, 0.7 MI LDPE resin blend was combined with 6% carbon black concentrate in extruder A. A 60%, 0.925 g/cc, 0.9 MI LLDPE/5% 0.941 g/cc, 6 MI HDPE/17% 0.925 g/cc, 1.0 MI LDPE was combined with 15% titanium dioxide, 1% Tinuvin 622 HALS stabilizer and 2% benzophenone stabilizer in extruder B. The A extruder mixer was combined with the B extruder mixer in an encapsulating flowplate/feedblock to give single structures with a variation in the white layer width from 20" to 28" wide. Striped films in four widths were made with seven width variations as follows: 4"/48", 4"/54", 4"/56", 4"/60", 4"/66", 4"/68", 18"/48", 18"/54", 18"/56", 18"/60", 18"/66", 18"/68", 24"/60", 24"/66", 28"/60", 28"/66".

Example 3

As a comparison, an opaque film with a full width of a reflective layer, such as taught by Kitamura et al. was made in the following manner.

A 53% 0.925 g/cc, 0.7 MI LDPE/31.5% 0.920 g/cc, 12 MI LDPE resin blend was combined with 13.5% titanium dioxide and 2% of a nickel (UV-1084) stabilizer in extruder A. An 85%, 0.925 g/cc, 0.7 MI LDPE/9% 0.920 g/cc, 20 MI LDPE resin blend was combined with 6% carbon black in extruder B. The reflective layer from extruder A was joined with the energy absorbing layer from extruder B in a conventional 40%/60% division flowplate/feedblock and passed through a coat hanger type die. The extruded sheet was pulled down to a 1.40 mil gauge at a width of 66".

Example 4

As further comparison, an opaque film was made with the following composition and dimensions.

An 88% 0.925 g/cc, 0.7 MI LDPE/7% 0.920 g/cc, 20 MI LDPE resin blend was combined with 5% carbon black in an extruder. The blend was extruded into an embossed cast coat hanger type die and pulled down to a 1.25 mil thick, 66" wide black film. This film was used as a black control film.

Example 5

The following trials demonstrate the temperature effect produced by the presently disclosed invention.

A plant bed of 30" wide by 10" high by 500 feet long was formed with a tractor pulled bed former. The soil was a loomy-sand composition typical of central Florida west coast. One section of the test field was planted with bell pepper plants of the Enterprise variety; a second section of the test field was planted with tomatoes of the Solar Set variety, a hot set variety bred for the sub-tropic environment where warm evenings are typical. The plant beds were pre-treated with 98% methyl bromide/2% chloropicrin two weeks prior to planting. After planting the plant beds were treated with BRAVO and ENDOSULFAN. (BRAVO 720 Fungicide made by ISK BIOTECH CORPORATION; ENDOSULFAN or THIODAN made by FMC CORPORATION. AMBUSH Insecticide made by ICI AMERICAS INC. is also often used.) Weeds were controlled with ROUNDUP (MONSANTO).

Control samples included full width white and black mulch film with reflectivities varying from 32% to 48%, a silver and black mulch film and an all black mulch film. The white striped films varied in the width of the stripe from 6" to 30" wide and had a reflectivity of 40%–44%.

Soil temperatures were measured with a soil thermometer at depths of 2", 4" and 6" and demonstrates the gradient temperature effect achieved by the structure as indicated in the following tables.

TABLE 1

| Time Temperature Taken at 2" Depth | All Black Mulch Film (°F.) | Black Part of Striped Mulch Bed (°F.) | White Part of Striped Mulch Bed (°F.) |
| --- | --- | --- | --- |
| 9 am | 85° | 85° | 82° |
| 10 am | 98° | 104° | 90° |
| 11 am | 115° | 116° | 91° |
| 12 am | 116° | 118° | 98° |
| 2 pm | 120° | 120° | 100° |

TABLE 2

| Time/ Depth of Measure | Full Width Black Mulch (°F.) | Full Width Wh/Black Mulch (°F.) | 6" White on Black Striped Mulch(°F.) | | 18" White on Black Striped Mulch(°F.) | |
| --- | --- | --- | --- | --- | --- | --- |
| | All Black | All White | Black area | White Area | Black Area | White Area |
| 9 am/2" | 85° | 82° | 85° | 83° | 85° | 82° |
| 9 am/4" | 85° | 82° | 84° | 82° | 84° | 83° |
| 10 am/2" | 98° | 90° | 104° | 94° | 104° | 90° |
| 10 am/4" | 92° | 86° | 95° | 91° | 97° | 87° |
| 11 am/2" | 115° | 93° | 116° | 98° | 116° | 91° |
| 11 am/4" | 105° | 88° | 105° | 90° | 106° | 89° |
| 12 pm/2" | 116° | 97° | 115° | 111° | 118° | 98° |
| 12 pm/4" | 110° | 92° | 110° | 97° | 112° | 93° |
| 2 pm/2" | 117° | 99° | 118° | 112° | 120° | 100° |
| 2 pm/4" | 115° | 95° | 112° | 104° | 118° | 97° |

Example 6

The effect of two or more separate temperature zones along the top of the plant bed is shown to be an advantage over the current white and black or silver and black films in that the reflective area provides a beneficial growth environment for the vegetable or fruit plant while the black zone near the edge of the bed creates a more hostile environment for intruding weeds which send runners from the outlying areas adjacent to the plant bed. Most significantly, it has been demonstrated by this invention that the separate temperature zones beneath the mulch creates a microclimate which produces improved vapor circulation that transport harmful salt solutes away from the plant roots on the outer edges of the varied bed. The salt deposits on the outer edge of the bed have the added advantage of preventing weed penetration into the area of the growing plant.

To illustrate this advantage, the following experiment was conducted.

After 120 days of plant growth and three tomato and pepper harvests, the plants were removed from the bed. Soil samples were taken on each of the control films and the striped white and black films from the pepper section of the test field with 15 replicates each. The soil was tested at a depth of 2" for a total soluble salt content according to the method described by S. Donohue and S. Heckendorn. The results show the movement of salt out and away from the plant at the center of the plant bed and toward the edge as indicated in FIG. 4.

Figure 4:
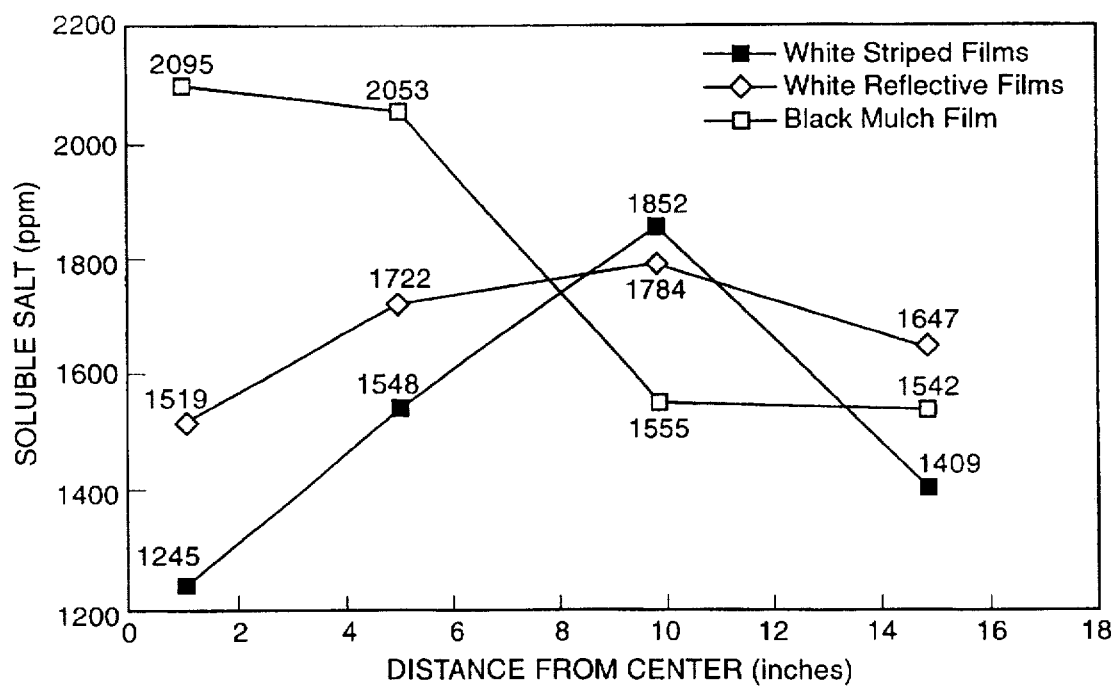
FIG. 4 shows the resulting salt concentration across the plant bed for experiments described below.

As demonstrated in FIG. 4, the white striped films, according to the present invention, provide substantially reduced salt concentration at the center of the bed which rises as the distance away from the center-line increases. On the contrary, white reflective films provide a more uniform salt concentration across the bed while black mulch film provides high salt concentrations toward the center of the bed.

Example 7

The striped film structure of the present invention has been tested against standard black mulch and white on black or silver on black full width coextruded mulch films to compare yield of vegetables per acre. The added benefits of weed barrier and salt transport discovered by the applicant and disclosed above is expected to improve the growth of the plant and increase the fruit yield in all warm climates, but especially in the late summer and early fall planting seasons.

In order to demonstrate this effect, a yield study was conducted on both peppers and tomatoes. The seedlings were planted in late August and cultivated until October when the first harvest was taken. Each row of pepper was tested with one type of each mulch film. Each row was planted with approximately 200 plants. Fifty plants each were selected and tested in a random fashion. Each row of tomato was tested with one type of mulch film. Each row was planted with approximately 100 plants, 20 plants each were selected and tested in a random fashion excluding badly diseased plants and those plants immediately adjacent to badly diseased plants. The same plants were sampled at first and second harvest. Fruit was picked and separated according to standard market sizes and colors and weighed. A second crop was taken several weeks later. The results, tabulated below in Tables 2 and 3 clearly show an improvement in the amount of desirable red pepper from size and quality and a significant increase in the amount of tomatoes harvested compared to black mulch, white and black reflective mulch and silver and black full width reflective mulch.

TABLE 2

| Film Type | Percent of Tomato Yielded** Vs. Stripe Width | | | Percent of Pepper Yielded** Vs. Stripe Width | | |
|---|---|---|---|---|---|---|
| | Ratio of Stripe | 1st Harvest | Total Harvest | Ratio of Stripe | 1st Harvest | Total Harvest |
| 6" Stripe/ 30" Plant Bed | 0.20 | 8.6% | 11.7% | 0.20 | 21.1% | 19.4% |
| 18" Stripe/ 30" Plant Bed | 0.60 | 16.8% | 16.2% | 0.60 | 29.6% | 28.8% |
| 22" Stripe/ 30" Plant Bed | 0.73 | 16.6% | 15.9% | 0.73 | 25.7% | 23.2% |
| 24" Stripe/ 30" Plant Bed | 0.80 | 15.8% | 14.6% | 0.80 | 23.6% | 28.6% |
| 30" Stripe/ 30" Plant Bed | 1.00 | 9.7% | 10.8% | 1.00 | * | * |
| TOTAL | | 100% | 100% | | 100% | 100% |

**percentage of tomato or pepper on a particular striped film subset calculated as a percent of entire striped film set.
*Pepper not planted on 30" wide striped film.

TABLE 3

| | Tomato Yield pounds per 1000 bushes | | | Pepper Yield pounds per 1000 bushes | | |
|---|---|---|---|---|---|---|
| | 1st Harvest | X-L Premium | Total Harvest | 1st Harvest | L Premium | Total Harvest |
| Black Mulch | 1440 | 920 | 4150 | — | — | — |
| White/ Black Mulch | 2700 | 1380 | 5900 | 760 | 270 | 1170 |
| Silver/ Black Mulch | 1350 | 950 | 3900 | 620 | 370 | 1340 |
| White Striped Mulch | 4660 | 2420 | 9350 | 1130 | 590 | 1570 |

*yield study conducted in summer/fall 1995; peppers not tested on black mulch film.

All publications mentioned hereinabove are hereby incorporated in their entirety by reference.

While the foregoing invention has been described in some detail for purposes of clarity and understanding, it will be appreciated by one skilled in the art from a reading of this disclosure that various changes in form and detail can be made without departing from the true scope of the present invention and appended claims.

What is claimed is:

1. A polymeric mulch film or sheet for use in agriculture comprising energy absorbing or energy transmitting regions and at least one energy reflective region between said energy absorbing or transmitting regions being constructed and arranged such that when said film is placed over a plant bed, a temperature differential is produced between the region of said bed covered by said energy absorbing or energy transmitting regions and said at least one energy reflective region.

2. The polymeric mulch film or sheet of claim 1 wherein said reflective region is a stripe substantially centered between substantially equal areas of said absorbing regions.

3. The polymeric mulch film or sheet of claim 1 wherein said reflective region comprises two stripes separated by said absorbing regions.

4. The polymeric mulch film or sheet of claim 1 which is formed by coextrusion of said absorbing and reflective regions.

5. The polymeric mulch film or sheet of claim 1 which is formed by laminating said absorbing and reflective regions.

6. The polymeric mulch film or sheet of claim 1 wherein at least one of said absorbing region is black.

7. The polymeric mulch films sheet of claim 1 wherein said reflective region is silver or white.

8. The polymeric mulch film or sheet of claim 1 wherein at least one of said energy transmitting regions is clear or translucent.

9. In a method of growing plants with mulch film where the improvement is the use of a polymeric mulch film or sheet comprising energy absorbing or transmitting regions and at least one energy reflective region between said energy absorbing regions which are constructed and arranged such that when said film is placed over said plant bed, a temperature differential is produced between the region of bed covered by said energy absorbing regions and said at least one energy reflective region.

10. The method of claim 9 wherein said reflective region is a stripe substantially centered between substantially equal areas of said absorbing regions.

11. The method of claim 9 wherein said reflective region is two stripes separated by and surrounded by said absorbing regions.

12. The method of claim 9 wherein said polymeric mulch film or sheet is formed by coextrusion of said absorbing and reflective regions.

13. The method of claim 9 wherein said polymeric mulch film or sheet is formed by laminating said absorbing and reflective regions.

14. The method of claim 9 wherein at least one of said absorbing regions is black.

15. The method of claim 9 wherein said reflective region is white or silver.

16. The method of claim 9 wherein said at least one absorbing region is clear or translucent.

* * * * *

UNITED STATES PATENT AND TRADEMARK OFFICE
CERTIFICATE OF CORRECTION

PATENT NO. : 5,729,929
DATED : Mar. 24, 1998
INVENTOR(S) : BURKE

It is certified that error appears in the above-identified patent and that said Letters Patent is hereby corrected as shown below:

ON THE COVER PAGE:

Reads:         [21] Aug. 25, 1996

Should read:    [21] July 25, 1996

Signed and Sealed this

Twenty-fifth Day of May, 1999

Attest:

Q. TODD DICKINSON

*Attesting Officer*      *Acting Commissioner of Patents and Trademarks*